(12) United States Patent
Uno et al.

(10) Patent No.: US 8,523,497 B2
(45) Date of Patent: Sep. 3, 2013

(54) CUTTING INSERT AND INDEXABLE FACE MILL

(75) Inventors: Kazuyuki Uno, Iwaki (JP); Naoto Nishiya, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 31 days.

(21) Appl. No.: 13/327,408

(22) Filed: Dec. 15, 2011

(65) Prior Publication Data

US 2012/0087748 A1 Apr. 12, 2012

Related U.S. Application Data (63) Continuation of application No. PCT/JP2010/059971, filed on Jun. 11, 2010.

(30) Foreign Application Priority Data

Jun. 16, 2009 (JP) ................................. 2009-142826

(51) Int. Cl.
*B23C 5/20* (2006.01)

(52) U.S. Cl.
CPC ........................................ *B23C 5/20* (2013.01)
USPC ................................ 407/42; 407/61; 407/113

(58) Field of Classification Search
USPC ............................................ 407/42, 61, 62, 113
IPC ................................................ B23C 5/16, 5/20
See application file for complete search history.

(56) References Cited

U.S. PATENT DOCUMENTS

| 5,226,761 | A | 7/1993 | Satran et al. |
| 6,196,771 | B1 * | 3/2001 | Andersson ..................... 407/113 |
| 6,200,072 | B1 * | 3/2001 | Andersson ..................... 407/34 |
| 6,715,967 | B2 * | 4/2004 | Wiman et al. ................. 407/114 |
| 2004/0146365 | A1 * | 7/2004 | Usui et al. ..................... 407/113 |
| 2007/0297865 | A1 | 12/2007 | Hessman |

FOREIGN PATENT DOCUMENTS

| JP | 06-134611 | 5/1994 |
| JP | 2006-075913 | 3/2006 |
| JP | 2006-224278 | 8/2006 |
| JP | 2006-263841 | 10/2006 |
| JP | 2007-021622 | 2/2007 |

OTHER PUBLICATIONS

English machine translation of JP 2006-224278.*

(Continued)

*Primary Examiner* — Daniel Howell
*Assistant Examiner* — Alan Snyder
(74) *Attorney, Agent, or Firm* — Womble Carlyle (57) ABSTRACT

A pair of sub-flank surfaces is formed at a vertex angle portion of an insert body having a substantially polygonal, plate-like shape, and between the sub flank surfaces, a vertex flank surface at a vertical angle portion is formed substantially in a protrusive, curved shape, and is smoothly connected to the sub-flank surfaces in a tangential direction. The vertex flank surface at the vertex angle portion is extended across the entire thickness of the insert body, and boundary lines, between the vertex flank surface at the vertex angle portion and a pair of minor cutting edges, are parallel to each other. A second curved ridge line, which is formed between (i) the flank surface and (ii) the rake surface, and a first curved ridge line, which is formed between (i) the flank surface and (ii) the seat surface, have approximately same shape.

20 Claims, 8 Drawing Sheets

(56) References Cited

OTHER PUBLICATIONS

International Preliminary Report on Patentability dated Dec. 29, 2011 with English translation of IPRP issued in counterpart PCT Application No. PCT/JP2010/059971.

International Search Report in PCT/JP2010/059971, dated Aug. 3, 2010.
Official Action dated Feb. 8, 2013 issued in Chinese counterpart application (No. 201080018366.1).
Official Action dated Feb. 27, 2013 issued in Russian counterpart application (No. 2011151385).

* cited by examiner

# CUTTING INSERT AND INDEXABLE FACE MILL

CROSS-REFERENCE TO RELATED APPLICATIONS

This application is a Continuation of PCT application No. PCT/JP2010/059971 filed Jun. 11, 2010 and published as WO 2010/147065 on Dec. 23, 2010, which claims the benefit of Japanese Patent Application No. 2009-142826, filed Jun. 16, 2009. The aforementioned patent applications are incorporated by reference herein in their entirety.

BACKGROUND OF THE INVENTION

1. Field of the Invention

The present invention relates to a cutting insert and an indexable face mill on which such cutting inserts are mounted.

2. Description of the Related Art

Cutting inserts have been proposed that are available both for a case wherein, when the cutting inserts are mounted on a face mill, they are to be fed to the right of the inserts, as viewed from the front in the rotational direction of the tool (hereinafter, this is referred to as a right hand cut), and for a case wherein they are to be fed to the left of the inserts, as viewed from the front in the rotational direction of the tool (hereinafter, this is referred to as a left hand cut).

A cutting insert disclosed in Japanese Patent Laid-Open No. 2006-224278 has a nearly polygonal shape, whereon paired minor cutting edges are provided for the individual corners, and are extended along the side ridges, while being inclined inwardly from the side ridges, and whereon clearance parts are formed between the individual minor cutting edge pairs, at a location inward from the insert relative to intersecting points of lines extended from the paired minor cutting edges. The clearance parts each include a flat portion and a V-groove or a round groove, formed between the minor cutting edge pair.

According to the Japanese Patent Laid-Open No. 2006-224278, the clearance parts are positioned between the minor cutting edge pairs, at the interior of the cutting insert, relative to the intersecting points of lines extended from the paired minor cutting edges. Therefore, in a case wherein this insert is employed for both a right hand cut and a left hand cut, when one of the paired minor cutting edges has been worn out by cutting, an increase in the wear can be prevented by the presence of the clearance part, and wear of the other minor cutting edge can be avoided.

Figure 8:
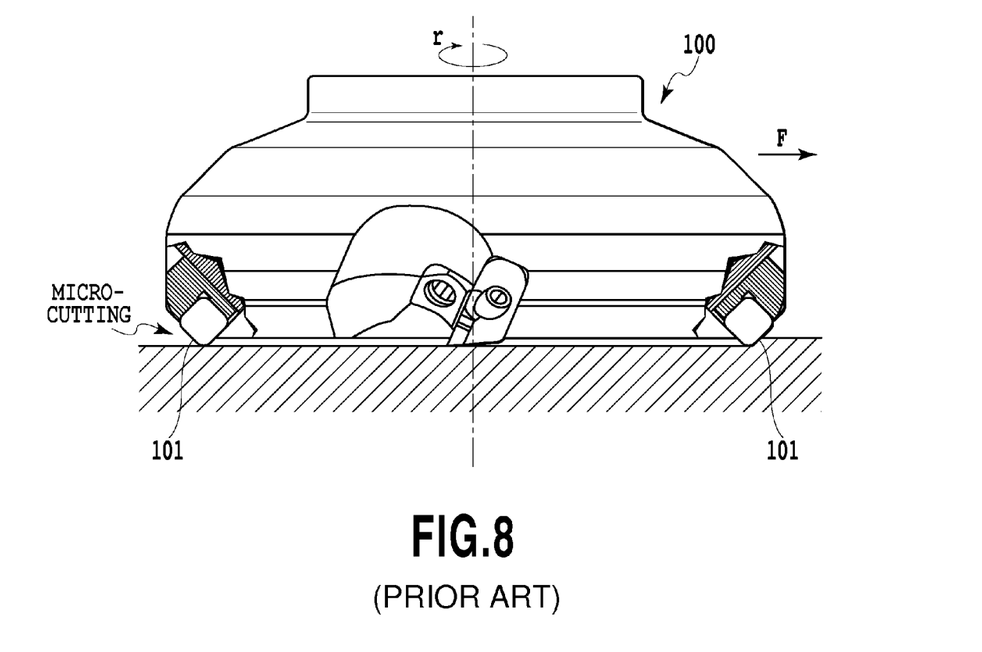
FIG. 8 is a partial cross-sectional view for explaining the cutting condition of the index face mill (the partial cross-sectional view is a cross-sectional view taken from the front in the rotational direction of the tool).

However, since the cutting insert described in Japanese Patent Laid-Open No. 2006-224278 includes the clearance parts positioned between the minor cutting edge pairs, that are formed at the interior of the insert, relative to the intersecting points of the lines extended from the paired minor cutting edges, the strength of the portions of the individual minor cutting edges adjacent to the clearance parts is reduced. Therefore, chipping or fracturing of the minor cutting edges may occur, and the finished surface roughness may be lowered. Furthermore, during the face milling process, when the cutting insert is positioned to the front of the center of the face mill in the feeding direction F, the cutting of a workpiece is to be performed, while when the cutting insert is positioned to the rear of the center in the feeding direction F, the cutting insert does not have an apparent contact with the workpiece. However, in actuality, since the inclination of the face mill body itself caused by cutting resistance or the main spindle of a machining tool, etc., are present a phenomenon has occurred that cutting inserts 101, which are located to the rear of the center of the face mill 100 in the feeding direction F, contact the work surface of the workpiece and perform micro-cutting on the work surface (see FIG. 8). During this micro-cutting, the portions where the minor cutting edges and the clearance parts are adjacent to each other contact the workpiece first, and cut the work surface. Since as described above the strength of the adjacent portions is lowered, the load due to micro-cutting is easily imposed on these portions, and chipping tends to occur. Therefore, there is a probability that the chipped minor cutting edges and the clearance parts will contact the work surface and degrade the surface roughness of the work surface.

SUMMARY OF INVENTION

To resolve this problem, one objective of the present invention is to provide a cutting insert that can be employed both for a left hand cut and a right hand cut, and for which the chipping resistances of minor cutting edges and adjacent portions are improved, in order to obtain a better surface roughness for a work surface, and an indexable face mill.

In order to achieve the above objective, the present invention provides a cutting insert of an almost polygonal shaped plate that is to be mounted detachably on a tool body 10 of an indexable face mill, comprising:

a rake surface 2 that is provided for the top face of the polygonal shape;

a seat surface 3 that is provided for the bottom face, opposite the top face;

main flank surfaces 4a that are substantially flat surfaces having positive relief angles, provided on side faces extended from side ridges of the top face;

pairs of sub-flank surfaces 4b that are provided on side faces extended from vertex angle portions of the polygonal shaped faces; and vertex flank surfaces 4c that are provided at the vertex angle portions between the pairs of sub-flank surfaces 4b, and are formed in a substantially projected outward curved shape, wherein the vertex flank surfaces 4c are smoothly connected with the sub-flank surfaces 4b in a tangential direction, and are extended along a thickness of the cutting insert in a direction along a vertex angle bisector line B;

wherein boundary lines 6a, formed by the vertex flank surfaces 4c and the pairs of sub-flank surfaces 4b, are parallel to each other; and wherein as viewed from a direction opposite the rake surface 2, almost the same shape is provided for upper, second curved ridges 5c formed along an intersecting ridge line portion of the vertex flank surfaces 4c and the rake surface 2 and for lower, first curved ridges that are formed along an intersecting ridge line portion of the vertex flank surfaces 4c at the vertex angle portion and the seat surface 3.

According to the present invention, the vertex flank surface 4c at the second vertex angle portion, provided between the pair of sub-flank surfaces 4b, separates the sub-flank surfaces 4b. Further, the second curved ridge 5c, formed between the pair of minor cutting edges 5b, separates these minor cutting edges 5b. As a result, when one of the pair of minor cutting edges 5b is damaged, the affect of such damage on the other minor cutting edge 5b can be prevented.

The boundary portion where the vertex flank surface 4c at the second vertex angle portion intersects the pair of sub-flank surfaces 4b, and the boundary portion where the second curved ridge 5c intersects the pairs of the minor cutting edges 5b are smoothly connected, in a tangential direction, to the pair of sub-flank surfaces 4b and the pair of minor cutting edges 5b, respectively, and the reduction in the strength in the vicinity of the boundary portion can be prevented. Furthermore, the vertex flank surface 4c at the second vertex angle portion is extended across the thickness of the insert body 1, and the boundary lines between the vertex flank surface 4c at the second vertex angle portion and the pair of sub-flank surfaces 4b are extended, parallel to each other, and with almost the same width, in a direction perpendicular to the direction of the thickness of the insert body 1. In addition, the intersecting ridge line portion of the vertex flank surface 4c at the second vertex angle portion and the seat surface 3 is substantially curved in consonance with the shape of the vertex flank surface 4c at the second vertex angle portion. As a result, an appropriate strength can be obtained for the entire vertex flank surface 4c at the second vertex angle portion to cope with a force (a cutting resistance) that is exerted on the second curved ridge 5c. With this arrangement, since the chipping resistance is increased for the vertex flank surfaces 4c at the second vertex portion and for the boundary portion between these surfaces and the pair of sub-flank surfaces 4b, the service life of the cutting insert can be extended, and degrading of the surface roughness of the work surface can be prevented. Especially, when micro-cutting for the work surface of a workpiece is performed by the cutting insert that is positioned to the rear of the center of the face mill in the feeding direction, the occurrence of chipping can be avoided for the portion where the minor cutting edge 5b, which contacts the workpiece first, and the second curved ridge 5c are adjacent to each other, and degrading of the surface roughness on the work surface can be prevented.

Further, the present invention provides the cutting insert, wherein an angle E, formed by the pair of minor cutting edges 5b, is in a range of 100° to 178°. Thus, since the angle formed by the pair of minor cutting edges 5b is set to 178° or smaller, one of the paired minor cutting edges 5b can be employed for cutting, while the other minor cutting edge 5b can be maintained not in use, without being in contact with the workpiece. However, when the angle formed by the minor cutting edges 5b is set smaller than 100°, the intersecting portion of the minor cutting edges 5b becomes sharp, and the strength might be reduced.

Furthermore, the present invention provides the cutting insert, wherein a radius of curvature Rc of the second curved ridge 5c is in a range of 0.4 mm to 2.5 mm. When a radius of curvature Rc for the second curved ridge 5c is set to 0.4 mm or greater, the strength for the second curved ridge 5c can be obtained. However, when the radius of curvature Rc is too great, the range of damage, caused when the second curved ridge 5c contacts the workpiece, will be increased, and accordingly, the cutting resistance is increased. Therefore, it is preferable that the radius of curvature Rc be 2.5 mm or smaller.

Moreover, the present invention provides the cutting insert, wherein a length Lb for the pair of minor cutting edges 5b is in a range of 0.5 mm to 3 mm. Since the length Lb for the minor cutting edges 5b is 0.5 mm or greater, efficient face milling processing can be performed at a higher feed rate, without the surface roughness on a working surface being degraded. However, when the length Lb for the minor cutting edges 5b is too great, the range where the minor cutting edges 5b contact the work piece is increased, and the cutting resistance is increased to cause chattering marks, or to degrade the surface roughness on the work surface. Therefore, it is preferable that the length Lb for the pair of minor cutting edges 5b be 3 mm or smaller.

Further, the present invention provides an indexable face mill comprising:
a tool body 10, which is to be rotated at a center line O, and on which one of the above described cutting inserts is to be mounted detachably,
wherein, when the cutting insert is mounted on the tool body 10, an axial rake angle AR is positive and a radial rake angle RR is negative, and of the pairs of the minor cutting edges 5b, the minor cutting edges 5b located at an outer circumference are positioned substantially at a right angle relative to the center line O.

According to the present invention, when one of the above described cutting inserts is mounted, the chipping resistance is increased at the portion where the minor cutting edges 5b and the second curved ridge 5c are adjacent to each other, and the surface roughness of the work surface can be improved.

The cutting insert is mounted on the tool body 10 to provide a so-called negative-positive edge type, for which the axial rake angle AR is positive and the radial rake angle RR is negative. With this arrangement, the cutting resistance of the face mill can be reduced. Especially, a thrust force exerted in a direction counter to a direction in which the workpiece is pressed can be reduced. This is effective for improving the chipping resistance of the portion where the second curved ridge 5c and the minor cutting edges 5b are adjacent to each other.

According to the cutting insert and the face mill of the present invention, since the second curved ridge 5c is formed to separate one minor cutting edge 5b from the other, when one of the minor cutting edges 5b in a pair is damaged, the other minor cutting edge 5b can be protected from being affected by such damage.

The vertex flank surface 4c at the second vertex angle portion and the second curved ridge 5c intersect, respectively, the pair of sub-flank surfaces 4b and the minor cutting edges 5b smoothly in a tangential direction, so that the reduction in the strength in the vicinity of the intersecting portion can be prevented. As a result, an appropriate strength can be obtained for the entire vertex flank surface 4c at the second vertex angle portion to cope with a force (a cutting resistance) that is exerted on the second curved ridge 5c. Furthermore, the vertex flank surface 4c at the second vertex angle portion is extended across the thickness of the insert body 1, and the boundary lines between the vertex flank surface 4c at the second vertex angle portion and the pair of sub-flank surfaces 4b are extended, parallel to each other, and with almost the same width, in a direction perpendicular to the direction of the thickness of the insert body 1. In addition, the intersecting ridge line portion of the vertex flank surface 4c at the second vertex angle portion and the seat surface 3 is substantially curved in consonance with the shape of the vertex flank surface 4c at the second vertex angle portion. As a result, an appropriate strength can be obtained for the entire vertex flank surface 4c at the second vertex angle portion to cope with a force (a cutting resistance) that is exerted on the second curved ridge 5c. With this arrangement, since the chipping resistance is increased for the portion where the pair of sub-flank surfaces 4b are adjacent to the vertex flank surfaces 4c at the second vertex portion, and for the portion where the minor cutting edges 5b are adjacent to the second curved ridge 5c, and degrading of the surface roughness of the work surface can be prevented.

The cutting insert is mounted on the tool body 10 to provide a so-called negative-positive edge type, for which the axial rake angle AR is positive and the radial rake angle RR is negative. With this arrangement, the cutting resistance of the face mill can be reduced. Especially, a thrust force exerted in a direction counter to a direction in which the workpiece is pressed can be reduced. This is effective for improving the chipping resistance of the portion where the second curved ridge 5c and the minor cutting edges 5b are adjacent to each other.

Further features of the present invention will become apparent from the following description of exemplary embodiments (with reference to the attached drawings).

DESCRIPTION OF THE EMBODIMENTS

Figure 1:
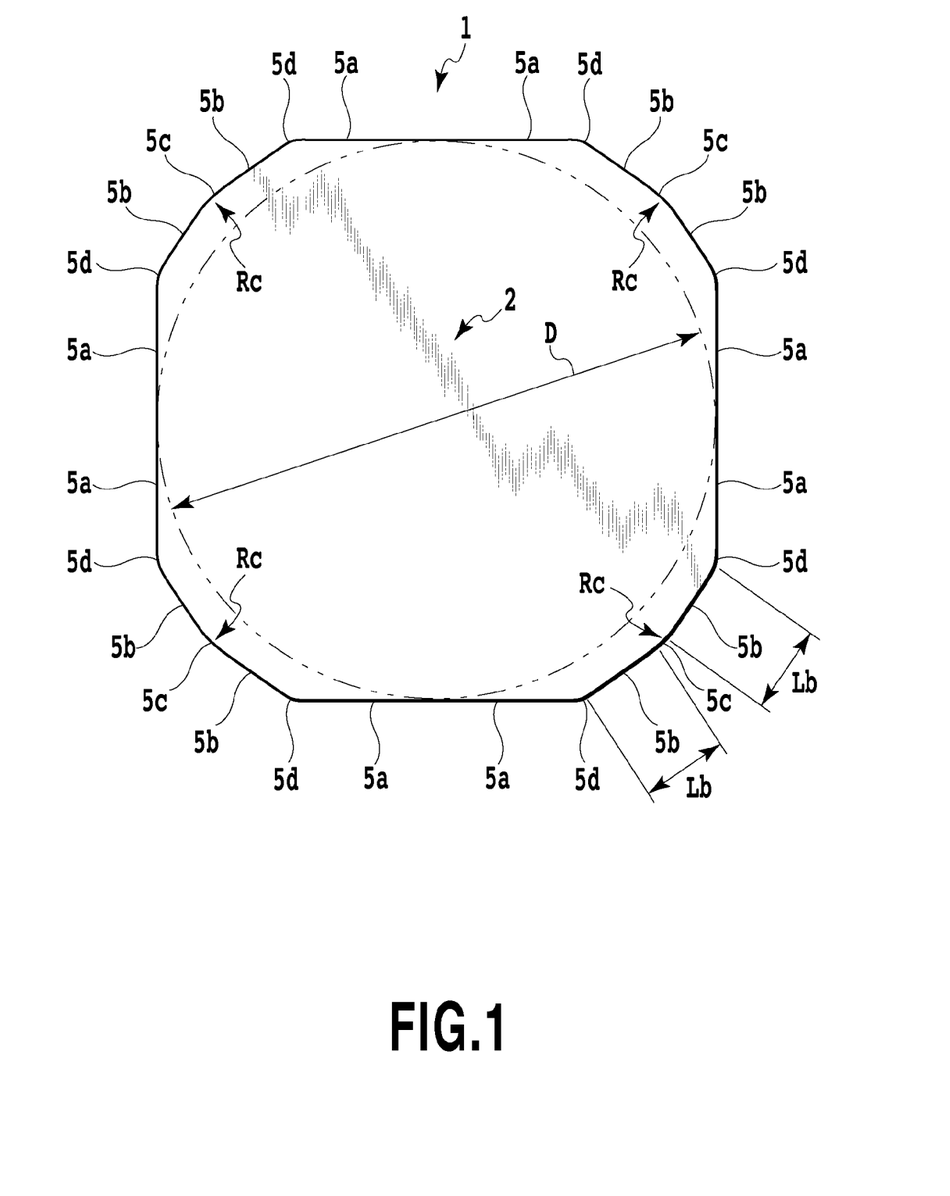
FIG. 1 is a front view of a cutting insert according to one embodiment of the present invention.
Figure 2:
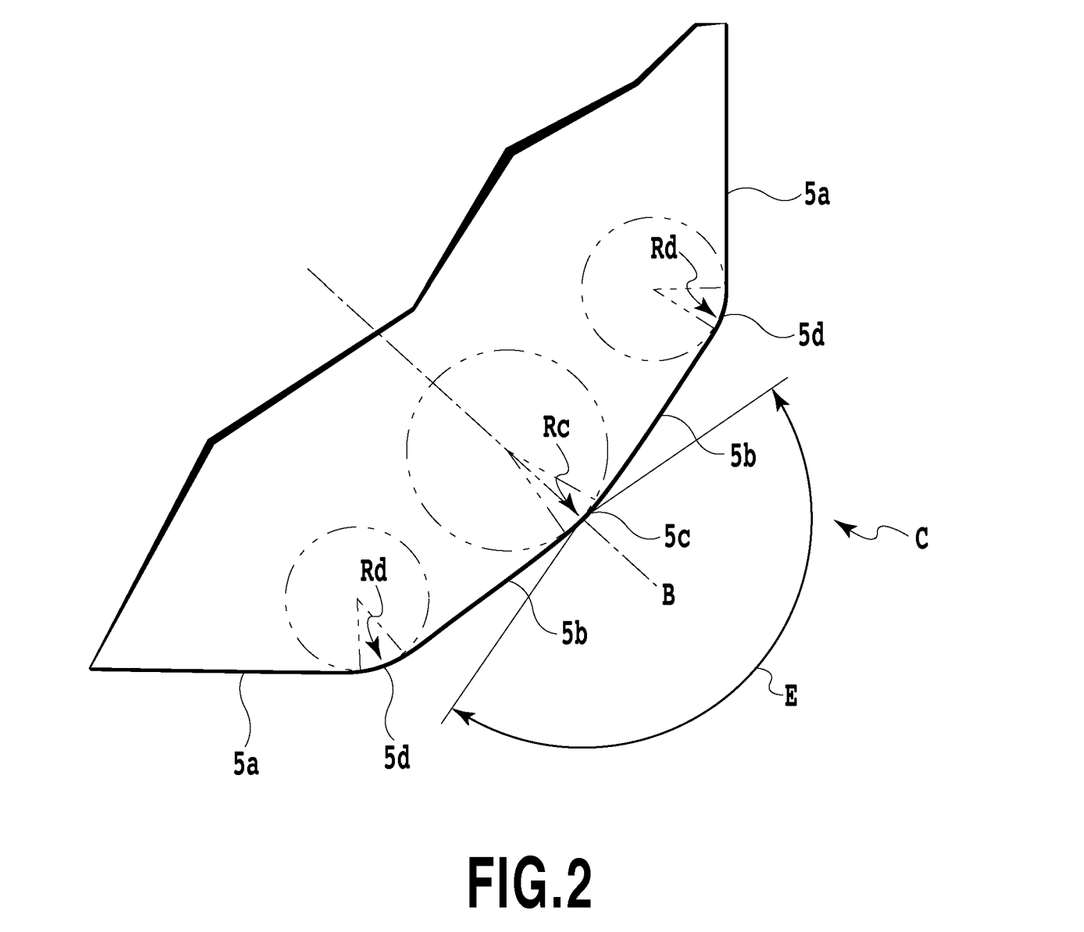
FIG. 2 is an enlarged front view of the corner of the cutting insert shown in FIG. 1.
Figure 3:
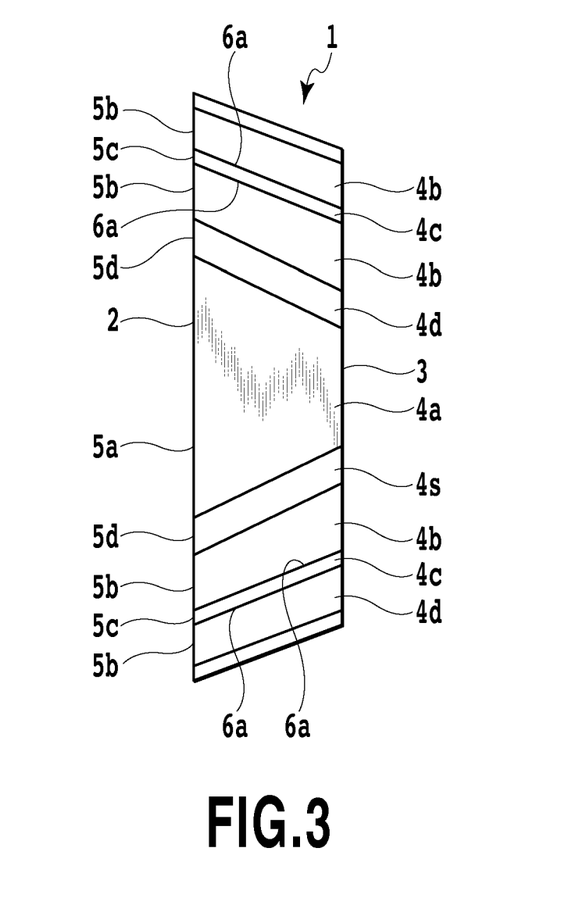
FIG. 3 is a right side view of the cutting insert in FIG. 1.

A cutting insert according to one embodiment of the present invention is an exemplary cutting insert to be mounted on a face mill having an approach angle of 48°. As shown in FIGS. 1 to 3, an insert body 1 is a plate having an almost square shape. The almost square upper face of the insert body 1 serves as a rake surface 2, the lower face opposite the upper face serves as a substantially flat seat surface 3, and the side faces extended between the upper and lower faces serve as flank surfaces. The inscribed circle diameter D of the almost square upper face is 12.7 mm. The intersecting ridge portions of the rake surface 2 and the flank surfaces serve as cutting edges. The side surfaces employed as the flank surfaces are gradually inclined to the interior of the insert body 1 in a direction from the intersecting portion of the upper face to the intersecting portion of the lower face, and a positive flank angle is formed. The rake surface 2 of the insert body 1 is provided as a flat upper face; however, a chipbreaker, such as a concave groove, may be formed adjacent to part of, or all of the cutting edges. The cutting edges are made of at least a hard material, such as cemented carbide, coated cemented carbide, cermets, ceramics, polycrystalline diamond or cubic boron nitride. In addition to an almost square shape, an almost polygonal shape, such as a rectangular, a parallelogram, a rhombic, a triangular, a pentagonal or a hexagonal shape, can be employed for the upper face of the insert body 1. The size for the polygonal shape can also be appropriately changed.

The cutting insert 1 includes at least main flank surfaces 4a, sub-flank surfaces 4b and vertex flank surfaces 4c at second vertex angle portions. As is apparent from FIGS. 3 to 5, the main flank surfaces 4a are formed on four almost flat side faces that are extended from the side ridges of the upper face in a square shape. The sub-flank surfaces 4b are formed on a pair of almost flat side faces near the corner C of the insert body 1. The pair of sub-flank surfaces 4b are bent toward the interior of the insert body 1, relative to the adjacent main flank surface 4a, i.e., are inclined toward the adjacent main flank surface 4a at an angle smaller than 180°. The vertex flank surface 4c at the second vertex angle portion is formed on the substantially curved side face between the pair of sub-flank surfaces 4b.

Figure 4:
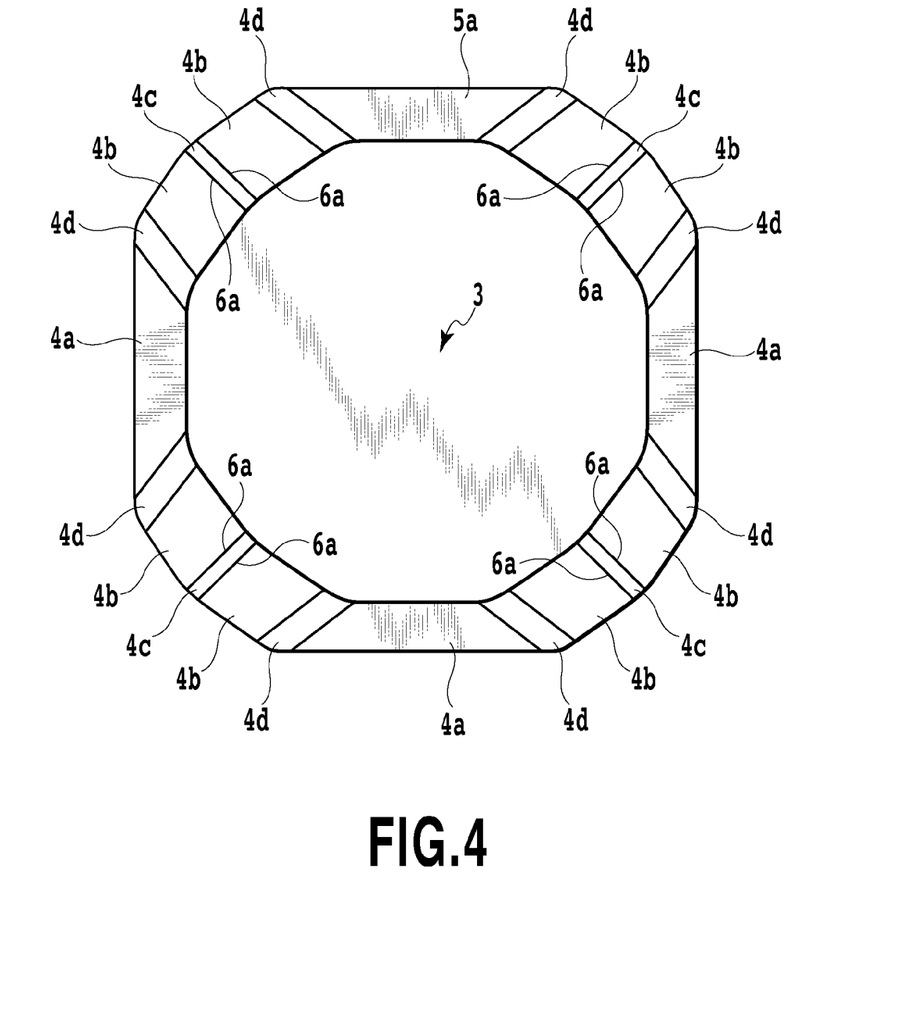
FIG. 4 is a rear view of the cutting insert shown in FIG. 1.

As is apparent, especially from FIGS. 2 to 4, the pair of sub-flank surfaces 4b and the vertex flank surface 4c at the second vertex angle portion are almost symmetric along a bisector line B for the vertex angle. Further, an angle E formed by the pair of sub-flank surfaces 4b ranges from 100° to 178°, and is 174° in this embodiment. A rounded flank surface 4d, which is a curved surface, is formed between the sub-flank surface 4b and the adjacent main flank surface 4a, and smoothly connects these surfaces 4b and 4a. The rounded flank surface 4d may be changed to an almost flat chamfered flank surface that obliquely intersects the sub flank surface 4b and the main flank surface 4a. The rounded flank surface 4d may not be formed, and the sub-flank surfaces 4b may be directly connected to the main flank surface 4a. Further, the paired sub-flank surfaces 4b may be curved surfaces that are projected outward of the insert body 1. In this case, the angle E formed by the pair of sub-flank surfaces 4b is regarded as an angle formed by virtual flat planes that pass both ends of the protruded curved face. In this case, the angle E also ranges from 100° to 178° C. The four side faces that serve as the main flank surfaces 4a are also employed as constrained surfaces that selectively contact a tool body 10 of a face mill when the cutting insert is positioned in the tool body 10.

The following relief angles are employed for the individual flank surfaces. The relief angle of the main flank surface 4a is set for a range of 7° to 25°, the relief angle of the sub-flank surface 4b is set for a range of 10° to 35°, and the relief angle of the vertex flank surface 4c at the second vertex angle portion in the direction of a vertex angle bisector line B, i.e., in the direction of the maximum inclination, is set for a range of 10° to 35°. Further, the relief angle of the sub-flank surface 4b is set equal to or greater than the relief angle of the main flank surface 4a. In this embodiment, the relief angle for the main flank surface 4a is set as 20°, and the relief angle for the sub flank surface 4b is set as 30°.

The cutting insert 1 includes at least a major cutting edge 5a, the pair of minor cutting edges 5b and the second curved ridge 5c. The major cutting edge 5a is linearly formed along the intersecting ridge portion of the rake surface 2 and the main flank surface 4a. The minor cutting edges 5b are formed almost linearly at the intersecting ridge portions of the rake surface 2 and the sub-flank surfaces 4b, and are provided as a pair at the corner C of the insert body 1. The second curved ridge 5c is formed almost curvilinearly at the intersecting ridge portion of the rake surface 2 and the vertex flank surface 4c at the second vertex angle portion. The pair of minor cutting edges 5b are substantially symmetric along the angle bisector line B of the corner C. The second curved ridge 5c is formed between the minor cutting edges 5b, and is smoothly connected to the individual minor cutting edges 5b in a tangential direction. A rounded corner 5d is formed in a curved shape between the minor cutting edges 5b and the adjacent major cutting edges 5a, and smoothly connects the minor cutting edges 5b to the major cutting edges 5a. The rounded corner 5d may be changed to a chamfered corner having a linear shape that obliquely intersects the minor cutting edges 5b and the major cutting edge 5a. Instead of forming the rounded corner 5d or a chamfered corner, the minor cutting edges 5b and the major cutting edge 5a may be directly connected.

A length Lb for the individual minor cutting edges 5b is set for a range of about 0.5 mm to 3 mm, and is set to 1.6 mm in this embodiment. When the pair of sub-flank surfaces 4b are substantially curved surfaces, the minor cutting edges 5b are also curved, in consonance with the shape of the sub-flank surfaces 4b. In this case, it is preferable that the radius of curvature for the minor cutting edges 5b be set for a range of 50 mm to 600 mm, while taking the finished surface roughness into account.

The angle E formed by the pair of the minor cutting edges 5b is set within a range of 100° to 178°, viewed in a direction opposite the rake surface 2 of the insert body 1, and is set to 174° in this embodiment. Furthermore, a radius of curvature Rc for the second curved ridge 5c is set for a range of 0.4 mm to 2.5 mm, and is set to 1 mm for this embodiment. A radius of curvature Rd for the rounded corner 5d is set for a range of 0.4 mm to 2.5 mm, and is set to 1.3 mm in this embodiment. When the corner is formed almost straight, the length of the cutting edge is set for a range of 0.4 mm to 2.5 mm.

Figure 5:
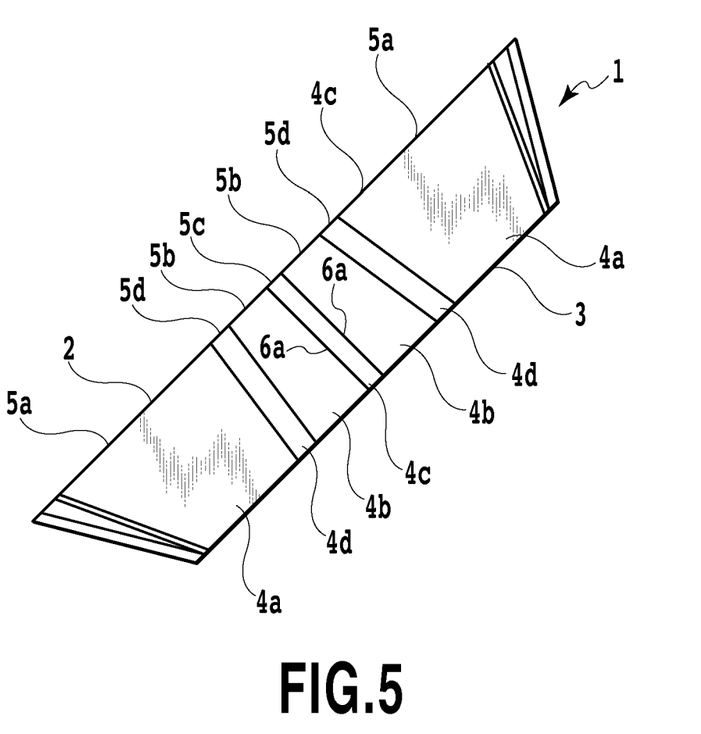
FIG. 5 is an enlarged diagram showing the cutting insert in FIG. 1, taken along the angle bisector line of the corner.

As shown in FIG. 5, when the cutting insert is viewed along the vertex angle bisector line B, two boundary lines 6a are present at borders between the pair of sub-flank surfaces 4b and the vertex flank surface 4c at the second vertex angle portion. The two boundary lines 6a are extended in a direction parallel to the perpendicular insert axis (not shown) passing through the rake surface 2 (or the seat surface 3), from the intersecting point for the rake surface 2 to the intersecting point for the seat surface 3, while being at a distance from each other in a direction perpendicular to the direction of thickness of the insert body 1. That is, the vertex flank surface 4c is extended from the rake surface 2 to the seat surface 3, with the constant radius of curvature being maintained. Further, the radius of curvature for the vertex flank surface 4c is set to an arbitrary value at which abnormal damage, such as chipping, will not occur. It should be noted that although the boundary lines 6a do not actually appear, these lines are indicated by solid lines in FIGS. 3 to 5 in order to make this embodiment easy to understand. Further, for the same reason, the boundary line between the rounded flank surface 4d and the main flank surface 4a and the boundary line between the rounded flank surface 4d and the sub-flank surface 4c are also indicated by solid lines in FIGS. 3 to 5.

The relief angles are not constant in the individual cross sections taken along normal lines of the second curved ridge 5c. The relief angle in the cross section along the bisector line B is a maximum value. The relief angles in the cross sections taken along the other normal lines are gradually reduced in a direction leading from the intersecting point of the second curved ridge 5c and the bisector line B to either of the two ends of the second curved ridge 5c.

Figure 6:
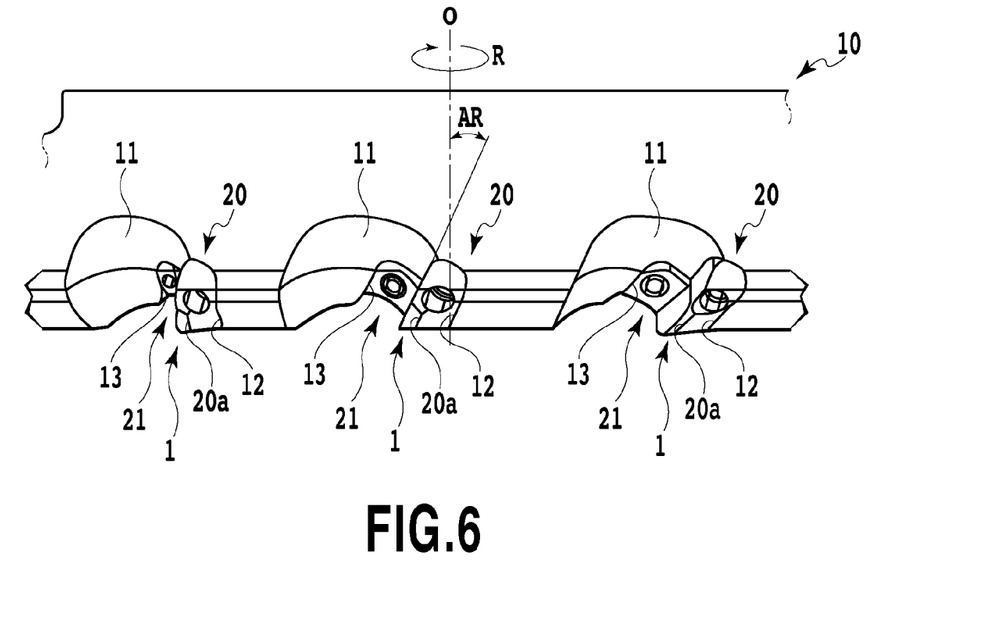
FIG. 6 is a front view of an indexable face mill on which the cutting insert in FIG. 1 is mounted.
Figure 7:
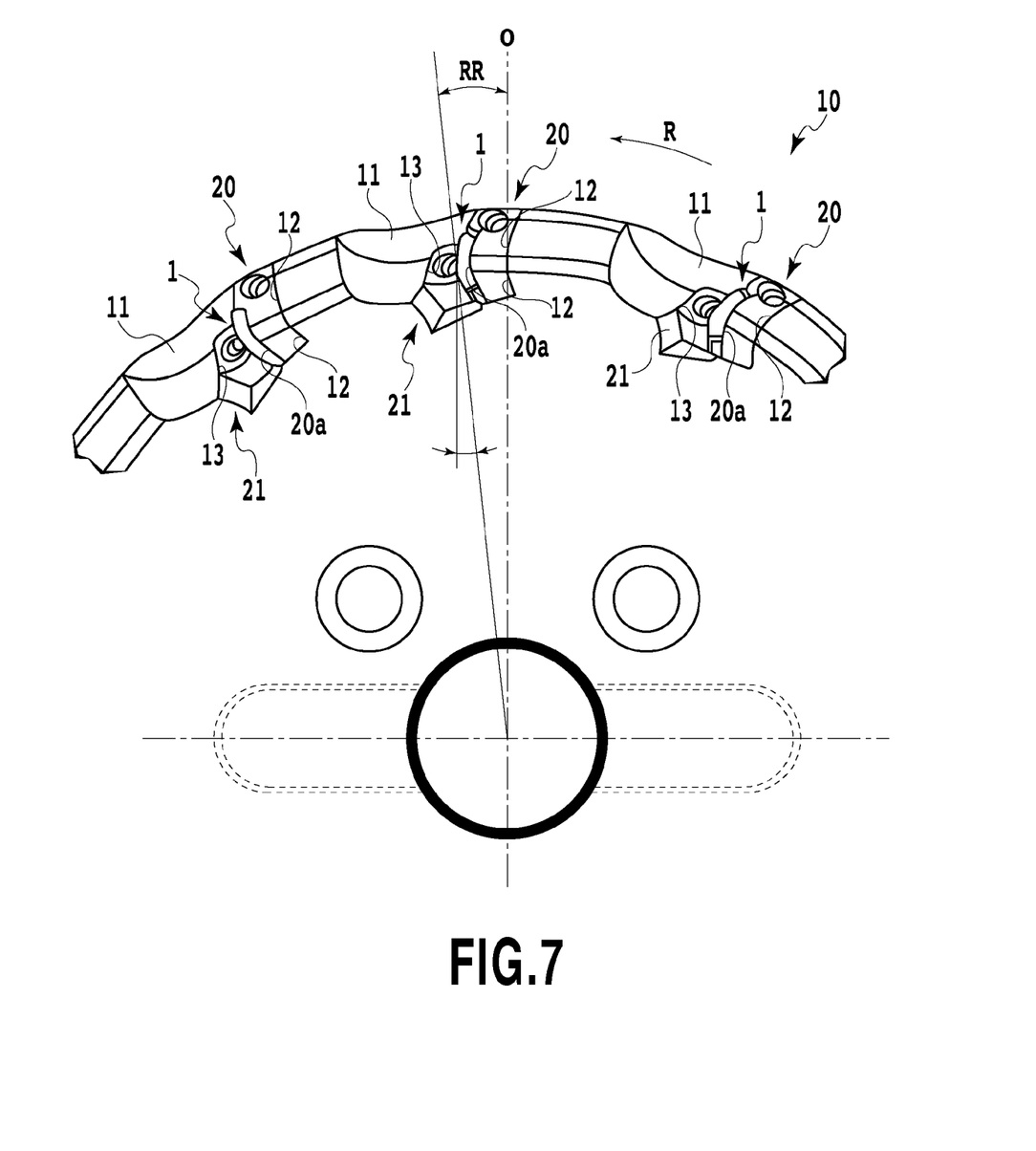
FIG. 7 is a bottom view of the indexable face mill in FIG. 6.

The above described cutting insert is employed for a face mill 100 shown in FIGS. 6 and 7. This face mill includes the tool body 10, which is to be rotated at the center line O, and for which the cutting inserts are to be detachably mounted on the peripheral face of the front end, at almost the same intervals in the circumferential direction.

A boss, formed at the rear end of the tool body 10, has an end face that abuts upon the end face of the main spindle of a cutting machine, or the end face of a milling head arbor. Further, the tool body 10 also has a through hole extended along the center line O. At the front face of the tool body 10, a plurality (twelve in this embodiment) of chip pockets 11 are recessed in the peripheral wall in the circumferential direction and at the same intervals. Insert mounting grooves 12 are formed at the rear, adjacent to the chip pockets 11 in the tool rotational direction R. Wedge insertion grooves 13 are formed at the front, adjacent to the insert mounting grooves 12 in the tool rotational direction R.

Holding members (locators), each of which includes an insert mounting seat 20a in which a cutting insert is to be seated, are securely fixed, by seat screws, to the insert mounting grooves 12. Wedge members 21 are inserted into the wedge insertion grooves 13 and are to be driven forward or backward along the depth of the wedge insertion grooves 13.

When the cutting insert is seated, the seat surface 3 contacts the bottom face of the insert mounting seat 20a of the holding member 20; and of the side faces that serve as the main flank surfaces 4a, a pair of side faces directed toward the rear end and not concerned with cutting serve as constrained faces, and abut on a pair of walls rising from the bottom face. The wedge 21 inserted in the insertion groove 13 in the direction of depth presses the top face of the cutting insert, i.e., the rake surface 2, toward the seat surface 3 to securely hold the cutting insert.

Since the relief angle of the sub-flank surface 4b of the cutting insert is equal to or greater than the relief angle of the main flank surface 4a, the cutting insert is mounted, on the tool main body 10 of the face mill, so that the axial rake angle AR has a positive value, and the radial rake angle RR has a negative value. In this embodiment, the cutting insert is mounted on a so-called negative-positive edge type face mill, for which the axial rake angle AR is set as about 24° and the radial rake angle RR is about −6°. Furthermore, the cutting insert is mounted on the tool body 10, so that, of pairs of the minor cutting edges 5b at the front end of the tool body 10, the minor cutting edges 5b positioned outside, in the direction of diameter of the tool body 10, are located perpendicular to the center line O of the tool body 10. When the above described angles are employed to mount the cutting insert on the tool body 10, the approach angle of the face mill is determined. The approach angle for the face mill in this embodiment is about 48°.

The second curved ridge 5c, adjacent to one of the minor cutting edges 5b of each pair, is not projected forward from the minor cutting edge 5b along the center line O. The other minor cutting edge 5b, located inward, in the direction of the diameter of the tool body 10, is gradually inclined to the rear along the center line O, relative to the plane perpendicular to the center line O, and to the interior in the direction of the diameter.

According to the cutting insert of the present invention, the vertex flank surface 4c at the second vertex angle portion, provided between the pair of sub-flank surfaces 4b, separates the sub-flank surfaces 4b, and the second curved ridge 5c, formed between the pair of minor cutting edges 5b, separates these minor cutting edges 5b. As a result, when one of the pair of minor cutting edges 5b is damaged, or worn out, the effect of such damage on the other minor cutting edge 5b can be prevented. Therefore, since the individual minor cutting edges 5b of a pair can be employed either for a right hand cut or a left hand cut, the number of nose corners available for the cutting insert can be doubled, and economic efficiency is improved.

The boundary portion 6a where the vertex flank surface 4c at the second vertex angle portion intersects the pair of sub-flank surfaces 4b, and the boundary portion 6a where the second curved ridge 5c intersects the pairs of the minor cutting edges 5b are smoothly connected, in a tangential direction, to the pair of sub-flank surfaces 4b and the pair of minor cutting edges 5b, respectively, and the reduction in the strength in the vicinity of the boundary portion can be prevented. Furthermore, the vertex flank surface 4c at the second vertex angle portion is extended across the thickness of the insert body 1, and the boundary lines between the vertex flank surface 4c at the second vertex angle portion and the pair of sub-flank surfaces 4b are extended, parallel to each other, and with almost the same width, in a direction perpendicular to the direction of the thickness of the insert body 1. In addition, the intersecting ridge line portion of the vertex flank surface 4c at the second vertex angle portion and the seat surface 3 is substantially curved in consonance with the shape of the vertex flank surface 4c at the second vertex angle portion. As a result, an appropriate strength can be obtained for the entire vertex flank surface 4c at the second vertex angle portion to cope with a force (a cutting resistance) that is exerted on the second curved ridge 5c. With this arrangement, since the chipping resistance is increased for the vertex flank surfaces 4c at the second vertex portion and for the boundary portion between these surfaces and the pair of sub-flank surfaces 4b, the service life of the cutting insert can be extended, and degrading of the surface roughness of the work surface can be prevented. Especially, when micro-cutting for the work surface of a workpiece is performed by the cutting insert that is positioned to the rear of the center of the face mill in the feeding direction, the occurrence of chipping can be avoided for the portion where the minor cutting edge 5b, which contacts the workpiece first, and the second curved ridge 5c are adjacent to each other, and a problem on degrading of the surface roughness on the work surface can be resolved.

For each cross section taken along the normal line of the second curved ridge 5c, the relief angle of the vertex flank surface 4c at the second vertex angle portion reaches the maximum in the cross section along the bisector line B of the second curved ridge 5c, and becomes smaller in a direction leading from the intersecting point of the second curved ridge 5c and the bisector line B to the two ends of the second curved ridge 5c. With this structure, the edge strength of the second curved ridge 5c is increased near the boundary portions between the second curved ridge 5c and the adjacent minor cutting edges 5b. As a result, since the chipping resistance is increased in the vicinity of the boundaries between the second curved ridge 5c and the pair of minor cutting edges 5b, the service life of the cutting insert is extended, and the deterioration of the surface roughness of the finished surface can be prevented.

The relief angle of the vertex flank surface 4c at the second vertex angle portion, in the cross section along the normal line of the second curved ridge 5c, is increased in a direction leading from the two ends of the second curved ridge 5c to the intersecting point of the second curved ridge 5c and the bisector line B. Therefore, when damage has occurred in the vicinity of the boundary between one of the minor cutting edges 5b of the pair and the second curved ridge 5c, any effect of the damage on the other minor cutting edge 5b can be prevented. Further, in the micro-cutting process for the working surface of a workpiece employing the cutting insert positioned to the rear from the center of the face mill in the feeding direction, even when damage has occurred and is rapidly increasing in the vicinity of the boundary between one of the minor cutting edges 5b, which first contacted the workpiece, and the second curved ridge 5c, the spread of the damage to the other minor cutting edge 5b can be appropriately prevented. As a result, the other minor cutting edge 5b can be used properly, and the degrading of the surface roughness of the finished surface can be appropriately prevented.

Since the range of the angle formed by the adjacent minor cutting edge 5b across the second curbed ridge 5c is from 100° to 178°, one of the minor cutting edges 5b of a pair and the second curved ridge 5c are not projected from a line extended from the other minor cutting edge 5b, and are gradually separated from this extension line in a direction leading toward the intersecting portion of the main cutting edge 5a. Therefore, the minor cutting edge 5b and the vicinity of the boundary, between this minor cutting edge 5b and the second curved ridge 5c, can be appropriately prevented from contacting the workpiece. As a result, the minor cutting edge 5b and the vicinity of the boundary can be properly protected from being affected by damage to the other cutting edge 5b.

Since the radius of curvature Rc for the second curved ridge 5c is equal to or greater than 0.4 mm, the strength of the second curved ridge 5c can be obtained. However, when the radius of curvature Rc is too large, the range of damage due to the second curved ridge 5c contacting the workpiece would be increased, and the cutting resistance would be much greater. Therefore, it is preferable that the radius of curvature Rc for the second curved ridge 5c be 2.5 mm or smaller.

Since the length Lb for the pair of minor cutting edges 5b is set to 0.5 mm or greater, efficient face milling can be performed at a high feed rate, without degrading the surface roughness of the finished surface. However, when the length Lb of the minor cutting edges 5b is too great, the range wherein the minor cutting edge 5b contacts the workpiece would be increased, and the cutting resistance would be greater, so that chattering may occur, or the surface roughness of the finished surface may be degraded. Therefore, it is preferable that the length Lb for the pair of minor cutting edges 5b be equal to or smaller than 3 mm.

As described above, according to the face mill on which the cutting inserts of this embodiment are mounted, the chipping resistance can be increased at the portion where the minor cutting edge 5b and the second curved ridge 5c are located adjacent to each other, and the surface roughness of the finished surface can also be improved. Since the cutting insert is mounted on the tool body 10 to provide a so-called negative-positive edge structure, wherein the axial rake angle AR has a positive value and the radial rake angle RR has a negative value, the cutting resistance, especially of a thrust force exerted in a direction counter to the direction in which a workpiece is pressed, can be reduced. This is effective for improving chipping resistance at the portion where the second curved ridge 5c and the minor cutting edges 5b are adjacent to each other. Further, since the inclination of the face mill is suppressed due to the thrust force, it is possible to reduce the occurrence of a phenomenon that the cutting insert, located at the rear of the center of the face mill in the feeding direction, performs micro-cutting for the finished surface of a workpiece. As a result, the occurrence of chipping can be prevented at the portion where the minor cutting edge 5b, which first contacts the workpiece in the micro-cutting process, and the second curved ridge 5c are adjacent to each other, and the degrading of the surface roughness of the finished surface can be prevented.

There is a tendency for a general negative-positive edge type face mill that, when the boundary portion, between the minor cutting edges, which is formed on the front end of the face mill and is located forward in the tool rotational direction, and the adjacent second curved ridge, cuts into the workpiece, the boundary portion is damaged at an early time by receiving too high a load. On the other hand, according to the face mill in this embodiment, since the second curved ridge 5c exhibits a superior chipping resistance, degrading of the surface roughness of the finished surface can be prevented, and the service life of the cutting insert can be extended.

The present invention is not limited to the above described embodiment, and naturally, modifying, adding to, and partial deleting of the structure for the present invention are available without departing from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A single-sided cutting insert that is to be mounted detachably on a tool body (10) of an indexable face mill, comprising:
   a top face having a polygonal shape and a rake surface (2);
   a bottom face opposite the top face, the bottom face having a seat surface (3);
   main flank surfaces (4a) that are substantially flat surfaces having positive relief angles, provided on side faces extended from side ridges of the top face;
   pairs of sub-flank surfaces (4b) that are provided on side faces extended from vertex angle portions of the polygonal shaped faces; and
   vertex flank surfaces (4c) that are provided at the vertex angle portions between the pairs of sub-flank surfaces (4b), and are formed in a substantially projected outward curved shape,
   wherein the vertex flank surfaces (4c) are smoothly connected with the sub-flank surfaces (4b) in a tangential direction, and are extended along a thickness of the cutting insert in a direction along a vertex angle bisector line (B);
   wherein boundary lines (6a), formed by the vertex flank surfaces (4c) and the pairs of sub-flank surfaces (4b), are parallel to each other; and
   wherein as viewed from a direction opposite the rake surface (2), almost the same shape is provided for second curved ridges (5c), formed along an intersecting ridge line portion of the vertex flank surfaces (4c) and the rake surface (2), and for first curved ridges that are formed along an intersecting ridge line portion of the vertex flank surfaces (4c) at the vertex angle portion and the seat surface (3).

2. The cutting insert according to claim 1, wherein an angle (E), formed by the pairs of minor cutting edges (5b) having substantially a linear shape or a curved shape, that are located at intersecting ridge line portions of the rake surface (2) and the pairs of sub-flank surfaces (4b), is in a range of 100° to 178°.

3. The cutting insert according to claim 1, wherein a radius of curvature (Rc) for the second curved ridge (5c) is in a range of 0.4 mm or greater to 2.5 mm or smaller.

4. The cutting insert according to claim 1, wherein a length Lb for the pairs of minor cutting edges (5b) is in a range of 0.5 mm or greater to 3 mm or smaller.

5. The cutting insert according to claim 1, wherein:
   an angle (E), formed by the pairs of minor cutting edges (5b) having substantially a linear shape or a curved shape, that are located at intersecting ridge line portions of the rake surface (2) and the pairs of sub-flank surfaces (4b), is in a range of 100° to 178°, and
   a radius of curvature (Rc) for the second curved ridge (5c) is in a range of 0.4 mm or greater to 2.5 mm or smaller.

6. The cutting insert according to claim 1, wherein:
   an angle (E), formed by the pairs of minor cutting edges (5b) having substantially a linear shape or a curved shape, that are located at intersecting ridge line portions of the rake surface (2) and the pairs of sub-flank surfaces (4b), is in a range of 100° to 178°, and
   a length (Lb) for the pairs of minor cutting edges (5b) is in a range of 0.5 mm or greater to 3 mm or smaller.

7. The cutting insert according to claim 1, wherein the vertex flank surface (4c) is extended from the rake surface (2) to the seat surface (3), with a constant radius of curvature being maintained.

8. The cutting insert according to claim 1, wherein:
   a relief angle in a cross section taken along the vertex angle bisector line (B) is a maximum value, and
   relief angles in cross sections taken along normal lines to the second curved ridge (5c) are gradually reduced in a direction leading from the intersecting point of the second curved ridge (5c) and the vertex angle bisector line (B) to either of the two ends of the second curved ridge (5c).

9. An indexable face mill comprising:
   a tool body (10), which is to be rotated at a center line (O), and on which the cutting insert according to claim 1 is to be mounted detachably,
   wherein, when the cutting insert is mounted on the tool body (10), an axial rake angle (AR) is positive and a radial rake angle (RR) is negative, and of the pairs of the minor cutting edges (5b), the minor cutting edges (5b) located at an outer circumference of the tool body are positioned substantially at a right angle relative to the center line (O).

10. The indexable face mill according to claim 9, wherein:
    an angle (E), formed by the pairs of minor cutting edges (5b) having substantially a linear shape or a curved shape, that are located at intersecting ridge line portions of the rake surface (2) and the pairs of sub-flank surfaces (4b), is in a range of 100° to 178°.

11. A single-sided, indexable face mill cutting insert, comprising:
    a top face having a polygonal shape and a rake surface (2);
    a bottom face opposite the top face, the bottom face having a seat surface (3);
    main flank surfaces (4a) having positive relief angles provided on substantially flat side faces extending from the top face towards the bottom face;
    major cutting edges (5a) formed between the top face and the main flank faces (4a);
    vertex angle portions formed at corners of the cutting insert and connecting the top face to the bottom face;
    pairs of sub-flank surfaces (4b) provided at the vertex angle portions and extending from the top face towards the bottom face;
    pairs of minor cutting edges (5b) formed between the top face and the pairs of sub-flank surfaces (4b);
    vertex flank surfaces (4c) provided at corners of the cutting insert at the vertex angle portions between the pairs of sub-flank surfaces (4b), the vertex flank surfaces (4c) extending from the top face to the bottom face and having an outwardly projecting curved shape;
    boundary lines (6a) formed between each vertex flank surface (4c) and each member of a pair of sub-flank surfaces (4b), the boundary lines (6a) being parallel to each other and extending from the top face towards the bottom face; and
    wherein:
    the vertex flank surfaces (4c) are smoothly connected with the sub-flank surfaces (4b) in a tangential direction, and extend along a thickness of the cutting insert in a direction along a vertex angle bisector line (B); and
    second curved ridges (5c) formed at an intersection of the vertex flank surfaces (4c) and the rake surface (2) have substantially the same shape as first curved ridges formed at an intersection of the vertex flank surfaces (4c) and the seat surface (3).

12. The cutting insert according to claim 11, wherein:
    each pair of minor cutting edges (5b) is located on either side of a second curved ridge (5c); and an angle (E) defined by said each pair of minor cutting edges (5b) in is in a range of 100° to 178°.

13. The cutting insert according to claim 11, wherein a radius of curvature (Rc) for the second curved ridge (5c) is in a range of 0.4 mm or greater to 2.5 mm or smaller.

14. The cutting insert according to claim 11, wherein a length (Lb) for the pairs of minor cutting edges (5b) is in a range of 0.5 mm or greater to 3 mm or smaller.

15. The cutting insert according to claim 11, wherein:
each pair of minor cutting edges (5b) is located on either side of a second curved ridge (5c);
an angle (E) defined by said each pair of minor cutting edges (5b) in is in a range of 100° to 178°; and
a radius of curvature (Rc) for the second curved ridge (5c) is in a range of 0.4 mm or greater to 2.5 mm or smaller.

16. The cutting insert according to claim 11, wherein:
each pair of minor cutting edges (5b) is located on either side of a second curved ridge (5c);
an angle (E) defined by said each pair of minor cutting edges (5b) in is in a range of 100° to 178°; and
a length (Lb) of each minor cutting edge (5b) is in a range of 0.5 mm or greater to 3 mm or smaller.

17. The cutting insert according to claim 11, wherein the vertex flank surface (4c) extends from the rake surface (2) to the seat surface (3), with a constant radius of curvature being maintained.

18. The cutting insert according to claim 11, wherein:
a relief angle in a cross section taken along the vertex angle bisector line (B) is a maximum value, and
relief angles in cross sections taken along normal lines to the second curved ridge (5c) are gradually reduced in a direction leading from the intersecting point of the second curved ridge (5c) and the vertex angle bisector line (B) to either of the two ends of the second curved ridge (5c).

19. An indexable face mill comprising:
a tool body (10) having a center line (O) of rotation; and
a cutting insert according to claim 11 detachably mounted to the tool body,
wherein:
an axial rake angle (AR) is positive and a radial rake angle (RR) is negative, and
minor cutting edges (5b) located at an outer circumference of the tool body are positioned substantially at a right angle relative to the center line (O).

20. The indexable face mail according to claim 19, wherein:
an angle (E) formed by each pair of minor cutting edges (5b) is in a range of 100° to 178°; and
a radius of curvature (Rc) for the second curved ridge (5c) is in a range of 0.4 mm or greater to 2.5 mm or smaller.

* * * * *